United States Patent
Park et al.

(10) Patent No.: US 9,344,974 B2
(45) Date of Patent: May 17, 2016

(54) METHODS AND ARRANGEMENTS TO COORDINATE COMMUNICATIONS OF DIFFERENT TYPES OF DEVICES ON A WIRELESS NETWORK

(71) Applicant: Intel Corporation, Santa Clara, CA (US)

(72) Inventors: Minyoung Park, Portland, OR (US); Adrian P. Stephens, Cambridge (GB); Emily H. Qi, Camas, WA (US); Thomas A. Tetzlaff, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 13/730,994

(22) Filed: Dec. 29, 2012

(65) Prior Publication Data

US 2014/0105186 A1 Apr. 17, 2014

Related U.S. Application Data

(60) Provisional application No. 61/713,020, filed on Oct. 12, 2012.

(51) Int. Cl.
*H04J 3/00* (2006.01)
*H04W 52/24* (2009.01)

(52) U.S. Cl.
CPC .................................. *H04W 52/244* (2013.01)

(58) Field of Classification Search
CPC ...................................................... H04W 74/04
USPC ........................................................... 370/336
See application file for complete search history.

(56) References Cited

U.S. PATENT DOCUMENTS

| | | | |
|---|---|---|---|
| 2003/0210658 A1* | 11/2003 | Hernandez et al. | 370/311 |
| 2008/0101320 A1* | 5/2008 | Krahn et al. | 370/342 |
| 2012/0236789 A1* | 9/2012 | Dravida et al. | 370/328 |
| 2013/0022083 A1* | 1/2013 | Vasseur et al. | 375/132 |
| 2013/0235737 A1* | 9/2013 | Merlin et al. | 370/252 |

* cited by examiner

*Primary Examiner* — Wei Zhao
(74) *Attorney, Agent, or Firm* — Schubert Law Group PLLC (57) ABSTRACT

Logic may coordinate communications of different types of wireless communications devices such as high power and low power wireless communications devices. Logic may coordinate communications by assigning time slots to a low power station (LP-STA) in a management frame such as a beacon transmitted by an access point (AP) associated with the LP-STA. Logic of the high power stations (HP-STAs) may receive the beacon and shepard logic of the HP-STA may defer transmissions by the HP-STA throughout the duration(s) indicated in the beacon from the AP. Logic of the LP-STA may comprise carrier sense multiple access with collision avoidance logic to determine when to transmit a communication. Shepard logic of an HP-STA may detect the communication from the LP-STA and defer transmission of communication during a time duration for the communication by the LP-STA.

30 Claims, 8 Drawing Sheets

METHODS AND ARRANGEMENTS TO COORDINATE COMMUNICATIONS OF DIFFERENT TYPES OF DEVICES ON A WIRELESS NETWORK

BACKGROUND

The present disclosure relates generally to the field of wireless communications technologies. More particularly, the present disclosure relates to coordination of communications of different types of devices on a wireless network.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives as defined by the appended claims. The detailed descriptions below are designed to make such embodiments understandable and obvious to a person having ordinary skill in the art.

Generally, embodiments for coordinating communications of different types of devices on a network are described herein. Embodiments may comprise logic such as hardware and/or code to coordinate communications of different types of wireless communications devices such as high power wireless communications devices and low power wireless communications devices. Many embodiments coordinate communications by assigning time slots to a low power station (LP-STA) in a management frame such as a beacon transmitted by an access point (AP) associated with the LP-STA. For instance, the AP may include a time information element in a beacon. The LP-STA may receive the beacon, and parse the time element to determine a time slot within which to transmit a communication to the AP. In some embodiments, the time information element may include a duration field to identify the duration of the timeslot. In further embodiments, the time information element may comprise a device type field to identify the device type of the low-power devices as being associated with the time duration. And, in some embodiments, the time information element may include a periodicity field to indicate multiple time slots or periodic time slots within which the LP-STA may transmit a communication without interference from a high power device.

In further embodiments, the high power stations (HP-STAs) may receive the beacon and shepard logic of the HP-STAs may defer high transit power transmissions by the HP-STAs throughout the duration(s) indicated in the beacon from the AP.

In some embodiments, the LP-STA may comprise carrier sense multiple access with collision avoidance (CSMA/CA) logic to determine when to transmit a communication. The LP-STA may monitor a channel to determine if there is any communications traffic on the channel and, if the LP-STA does not sense other traffic on the channel, the LP-STA may initiate a communication on the channel. In several embodiments, the CSMA/CA logic may be supplemented by the exchange of a Request to Send (RTS) packet sent by the LP-STA, and a Clear to Send (CTS) packet sent by the intended receiver such as an AP. Thus alerting all nodes within range of the sender, receiver or both, to not transmit for the duration of the main transmission. This is known as the IEEE 802.11 RTS/CTS exchange.

In many embodiments, shepard logic of an HP-STA may detect the communication from the LP-STA and defer transmission of communication during a time duration for the communication by the LP-STA. In further embodiments, one or more of the HP-STAs may comprise shepard logic with logic to transmit time duration information corresponding to the time allocated to LP-STA transmissions. The time information may also include a periodicity of the time duration. In some embodiments, the time information may be included in a management frame when transmitted.

IEEE 802.11ah is being developed to support two very different types of devices in the sub 1 GHz frequency band: 1) a sensor type device and 2) a cellular offloading type device. The sensor device is typically powered with a small battery and does not support very high transmit power. For example, the low power sensor device deployed in an indoor environment may operate with 0 dBm (decibels (dB) of the measured power referenced to one milliwatt (mW)) transmit power to minimize its power consumption. This type of stations can be classified as "low transmit power STA (LP-STA)". Note that stations refer generally to any type of communications device and access points refer to a specific type of station.

On the other hand, the cellular offloading device is typically operated in an outdoor environment and supports a transmit power close to the maximum transmit power (e.g. 30 dBm in US) allowed to cover a much wider area compared to the low power sensor type device. This type of stations can be classified as "high transmit power STA (HP-STA)".

The sensitivity of the HP-STA may be significantly less than necessary for the HP-STA to detect LP transmissions, potentially causing collisions. Receive sensitivity is expressed using the version of decibel employed in measurements of radio power, the dBm. In the dBm scale, 0 dBm equals 1 mW. Power of 100 mW equals 20 dBm and power of 1000 mW (i.e., 1 W) equals 30 dBm. Power levels below 1 mW are expressed as negative number. For example, 0.01 mW would be −20 dBm.

The following discussion includes references to high transmit power transmissions and devices as well as low transit power transmissions and devices. For the purposes of clarity, the high power transmissions and devices will refer to any transmission having a power of more than 10 dBm and devices capable of transmissions having a power of more than 10 dBm. And the low power transmissions and devices will refer to any transmission having a power of 10 dBm or less and devices capable of transmissions having a power of up to 10 dBm.

Various embodiments may be designed to address different technical problems associated with coordinating communications of devices. For instance, some embodiments may be designed to address one or more technical problems such as deferring high transmit power transmissions that extend to an LP-STA or LP-AP during a low transmit power transmission between the LP-STA and LP-AP. The technical problem of deferring high transmit power transmissions that extend to an LP-STA or LP-AP during a low transmit power transmission may involve informing HP-STAs and HP-APs of the low power transmission, particularly for situations in which the HP-STA or HP-AP is unable to detect the low transit power transmission due to an insufficient receiver sensitivity for the low transmit power transmission.

Different technical problems such as those discussed above may be addressed by one or more different embodiments. For instance, some embodiments that are designed to address deferring high transmit power transmissions that extend to an LP-STA or LP-AP during a low transmit power transmission between the LP-STA and LP-AP may do so by one or more different technical means such as a high transmit power transmission from an LP-AP including a time duration during which the HP-STAs and HP-Aps should defer high transmit power transmissions or, in some embodiments, all transmissions. Further embodiments that are designed to informing HP-STAs and HP-APs of the low transmit power transmission may do so by one or more different technical means such as shepard logic in the MAC sublayer logic of an HP-STA or an HP-AP that may inform other HP-STAs and HP-APs of the time duration of the low transmit power transmission. In further embodiments, the shepard logic may establish a time duration, one time or periodic, for low transmit power transmissions by LP-STAs.

Some embodiments implement a 1 Megahertz (MHz) channel bandwidth for Institute of Electrical and Electronic Engineers (IEEE) 802.11ah systems. The lowest data rate in such embodiments may be approximately 6.5 Megabits per second (Mbps) divided by 20=325 Kilobits per second (Kbps). If two times repetition coding is used, the lowest data rate drops to 162.5 Kbps. In many embodiments, the lowest PHY rate is used for beacon and control frame transmissions. Although lowering the data rate may increase the transmission range, it takes much longer time to transmit a packet. According to one embodiment, the efficiency of the protocol may enable small battery-powered wireless devices (e.g., sensors) to use Wi-Fi to connect to the, e.g., Internet with very low power consumption.

Some embodiments may take advantage of Wireless Fidelity (Wi-Fi) network ubiquity, enabling new applications that often require very low power consumption, among other unique characteristics. Wi-Fi generally refers to devices that implement the IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf) and other related wireless standards.

Several embodiments comprise access points (APs) for and/or client devices of APs or other stations (STAs) such as cellular off-loading devices, routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Figure 1:
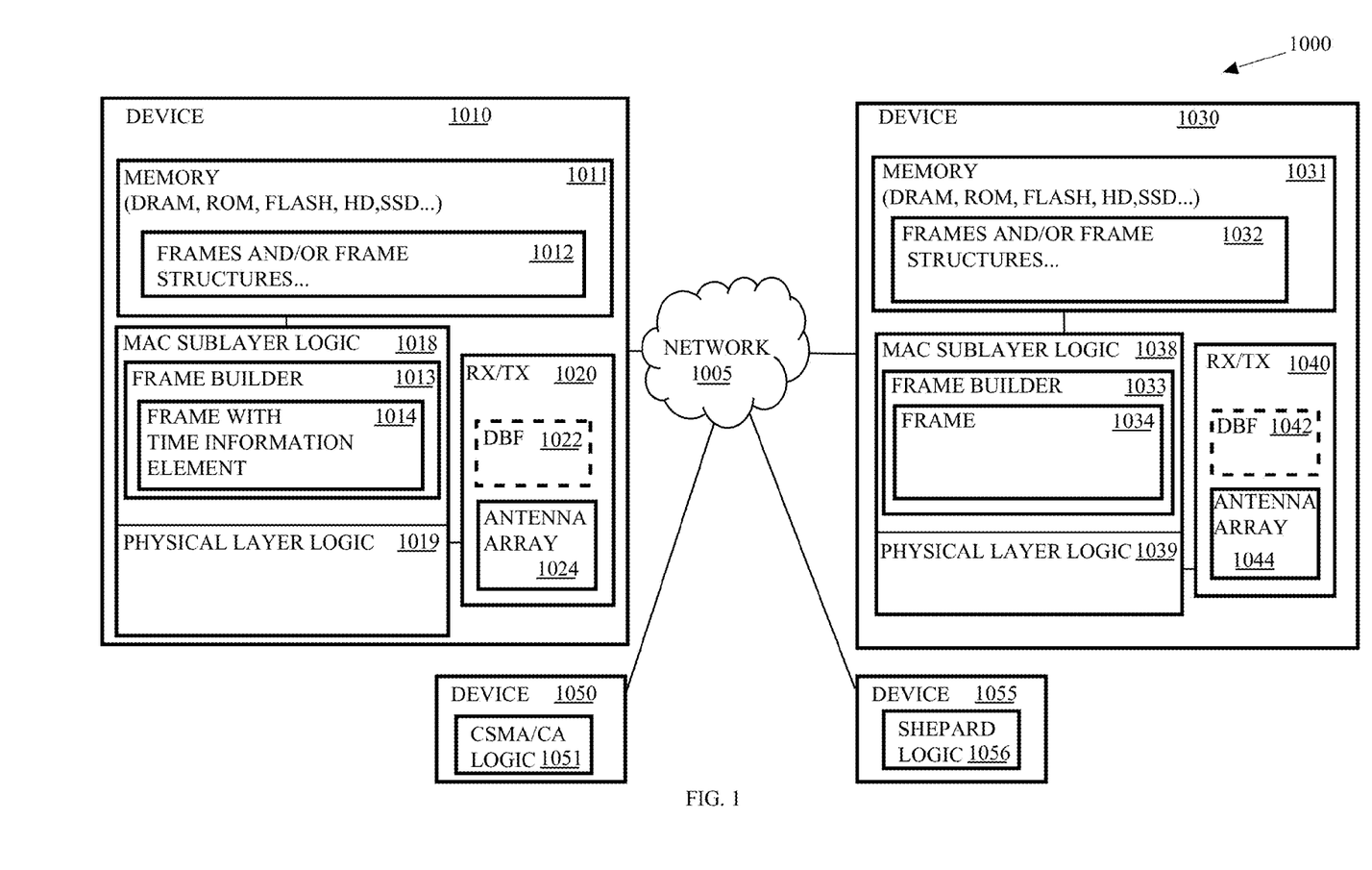
FIG. 1 depicts an embodiment of a wireless network comprising a plurality of communications devices.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise low and high power devices respectively and may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water meter usage meter.

In some embodiments, the communications device 1010 may be an AP of LP-STAs and may include time information, during which the LP-STAs may transmit packets, in a frame 1014 such as a beacon frame or other management frame. The time information may comprise a duration, and may, in further embodiments, also include a periodicity of the time duration, and may, in further embodiments, also include a device type indication to identify the type of device that is assigned to the time duration. For instance, the communications device 1010 may include information on device type (e.g. LP-STA) in a device type field of a time information element so that other communications devices 1030, 1050, and 1055 that receive the information know which type of STAs will be transmitting during the time duration.

In many embodiments, the management frame 1014 that contains the time information of the time duration and the device type may be transmitted at a high transmit power (HP). Thus, HP-STAs and HP-APs that have insufficient sensitivity to detect the low transmit power (LP) transmissions but are sufficiently near that their transmissions can collide with LP transmissions, can detect and receive the management frame 1014 from the communications device 1010. In response, low power devices, LP-STAs, such as the communications devices 1030 and 1050 may transmit packets during the time duration indicated in the management frame 1014 sent by the communications device 1010, the AP of the LP-STAs.

Furthermore, when HP-STAs, such as the communications device 1055, which may not hear the transmissions of the LP-STAs, receive the time information in the management frame 1014 transmitted by the AP of the LP-STAs, the HP STAs may defer their transmissions until after the time duration indicated in the management frames 1014.

To illustrate, the communications device 1010 may transmit a management frame 1014 identifying a time slot with a time duration, a periodicity, and a device type of LP-STA with a HP transmission. The time duration in combination with the device type may indicate that only LP-STAs may transmit during the time duration. In other embodiments, the management frame 1014 may indicate that devices may only transmit at a low transmission power.

The communications device 1055 may be an HP-STA and may receive the management frame 1014. Shepard logic 1056 of the communications device 1055 may defer transmissions, or at least HP transmissions in some embodiments, during the time duration(s).

The communications device 1030 may parse the management frame 1014 to determine the time duration associated with LP-STA and, as an LP-STA, may transmit a frame 1034 during the time duration indicated in the management frame 1014. The communications device 1050 may also be an LP-STA and may comprises CSMA/CA logic 1051 to monitor a channel to determine whether the channel is free to transmit. In situations wherein the communications devices 1030 and 1050 are sufficiently close to interfere with each others' communications, the CSMA/CA logic 1051 may sense the transmission by the communications device 1030 and defer transmission for a back off period or until a subsequent time slot such as a subsequent time slot reserved for LP-STAs.

In other situations wherein the communications devices 1030 and 1050 are not sufficiently close to interfere with each others' communications, the CSMA/CA logic 1051 may not sense the transmission by the communications device 1030 and may begin to transmit during the same time slot reserved for LP-STAs.

In further embodiments, the communications device 1055 may be a HP-STA and, in response to receiving the management frame 1014, the shepard logic 1056 of the communications device 1055 may defer transmissions during the time duration(s) and may transmit a frame such as a beacon frame or other management frame as an HP transmission to inform other HP-STAs of the time slot for the LP-STAs. For instance, once an LP-STA transmits using CSMA-CA, if there are no collisions, a "Shepherd" within the HP basic service set (HP BSS), such as one or more HP-STAs or a HP access point (HP-AP), may discover the transmission, and set a time duration aside during which HP-STAs should not transmit packets.

In some embodiments, the time duration may be determined by the HP-STAs. In further embodiments, the one or more HP-STAs, or the HP-AP, may comprise shepard logic to further act as the "Shepherd" by transmitting the time information corresponding to the time allocated to LP-STA transmissions. The time information may also include a periodicity of the time duration. The time information may be included as a time information element in a management frame when transmitted.

When the time information is received by a LP-STA, the LP-STA may choose to either ignore the time information, or to adopt and transmit packets during the time duration indicated in the management frame to avoid collisions with the HP-STAs. If the LP-STA adopts the time information, the shepherd logic may keep the time duration long enough for LP transmission to occur. If the LP-STA does not adopt the time information, the shepherd logic may reduce the time duration.

In many embodiments, transmission during the allocated time duration would only be LP transmissions, including transmissions by HP-STAs and the HP-AP, in order to ensure that the sensitivity footprint of the LP basic service set (LP BSS) components is matched. For example, HP-STA acknowledgements (ACKs) may be LP transmissions during this period. A frame builder 1013 of communications device 1010 may generate or select a frame based upon a frame structure 1012 in memory 1011 of communications device 1010. The medium access control (MAC) sublayer logic 1018 may communicate with the physical layer (PHY) logic 1019 to indicate that the transmission is an LP transmission and to transmit the frame. The PHY logic 1039 of communications device 1030 may receive the frame, decapsulate the payload data and present the data to the MAC sublayer logic 1038 to parse and interpret. The MAC sublayer logic 1038 may determine that the frame comprises time duration information to reserve a time slot for LP-STAs and may determine whether or not to utilize the time slot.

In many embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, and MAC sublayer logic 1018 and 1038, respectively. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may store the frames such as the management frames and/or the frame structures, and the memory 1011 and 1031 may store information to determine time durations.

In many embodiments, the management frames such as beacon frames, association request frames, and association response frames may comprise fields based upon the structure of the standard frame structures identified in IEEE 802.11.

Figure 1A:
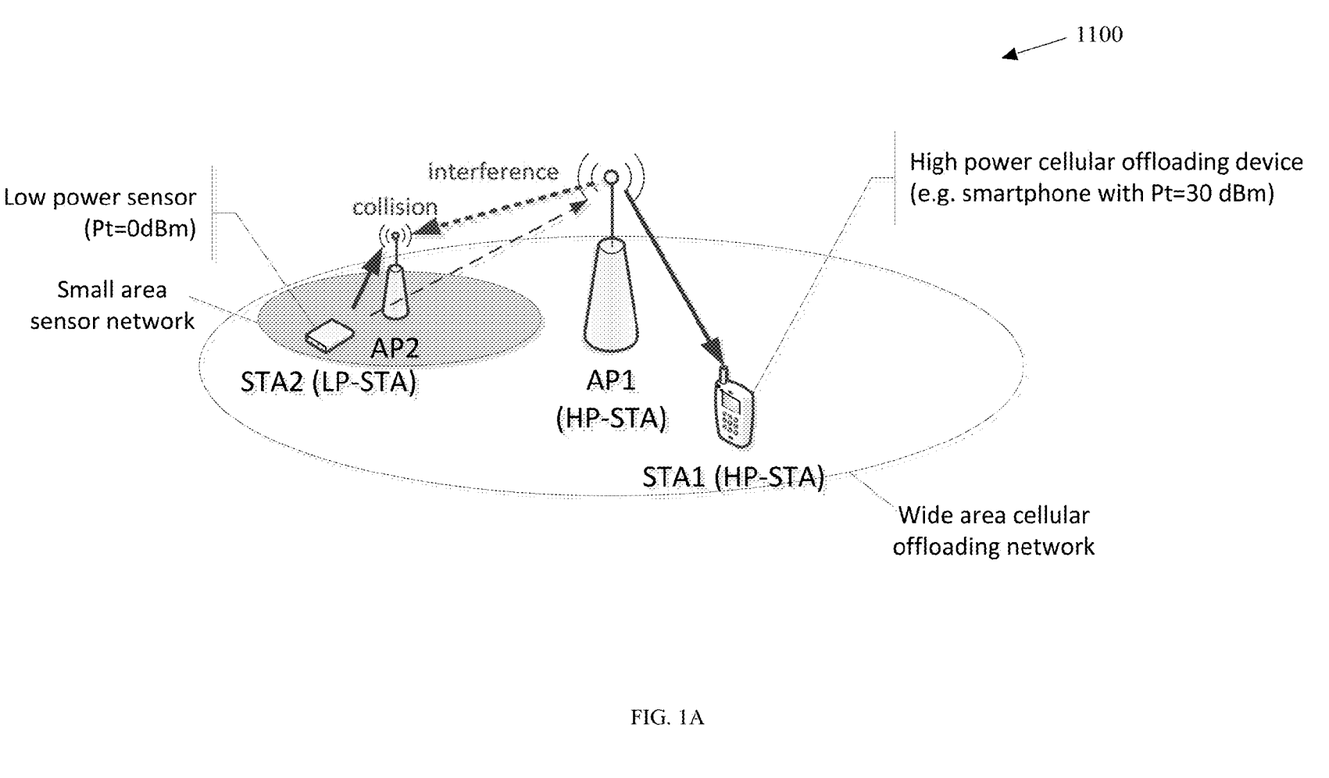
FIG. 1A depicts an embodiment of a wireless network comprising high power stations and low power stations.

FIG. 1A illustrates an embodiment of a wireless network comprising HP-STAs and LP-STAs. In this embodiment, since the two types of devices in 802.11ah are very different in terms of transmit power but still use the CSMA/CA channel access mechanism, in most cases, a cellular offloading station (HP-STA) will not be able to sense transmissions of a low transmit power sensor station (LP-STA). If the cellular offloading device determines that the channel is idle, it may transmit simultaneously with the low power sensor devices and this may cause collision to the transmissions of the LP-STA. The transmission of the time duration information by the AP2 may prevent such a situation by informing the HP-AP1 and possibly the HP-STA1 of the reservation of the time duration for LP-transmissions. In further embodiments, the HP-AP1 may comprise shepard logic to retransmit the time duration to the HP-STA1 to cause the HP-STA1 to defer HP transmissions during the time duration.

Figure 1B:
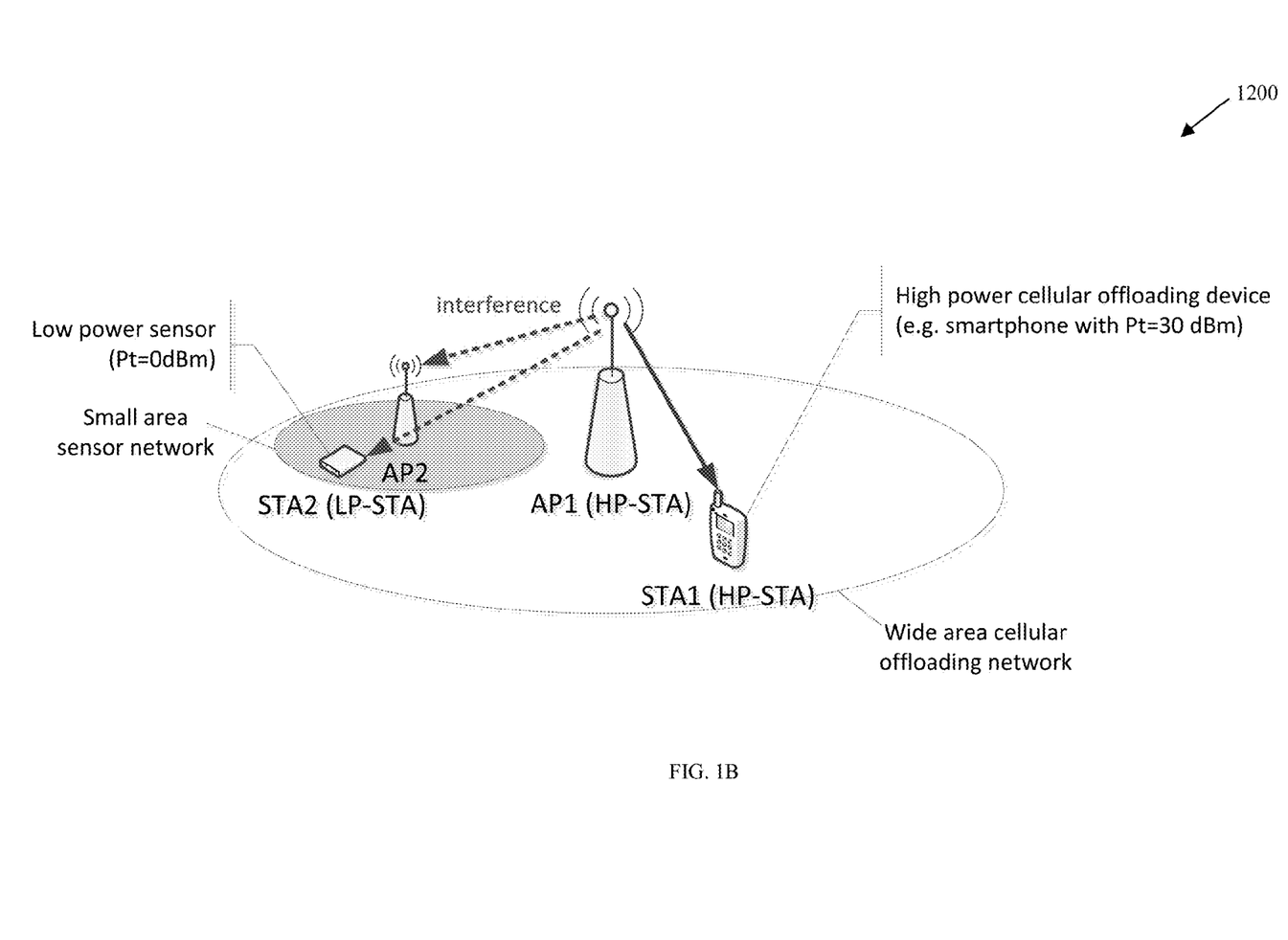
FIG. 1B depicts another embodiment of a wireless network comprising high power stations and low power stations.

FIG. 1B illustrates another embodiment of a wireless network comprising high power stations and low power stations. In this embodiment, when a cellular offloading station (HP-STA1) is transmitting packets at a high transmit power, a low transmit power sensor station (LP-STA2) can sense the transmissions of the cellular offloading device and defer until the channel is idle. This may make the low transmit power sensor station (LP-STA2) stay awake longer and consume more power. However, the transmission of a time duration by the HP-STA or the HP-AP may allow the LP-STA2 to remain in a power conservation state until the time duration reserved for LP transmissions and thus avoid the power usage required to wake only to sense a high power transmission on the channel. This is illustrated in FIG. 1B.

Figure 1C:
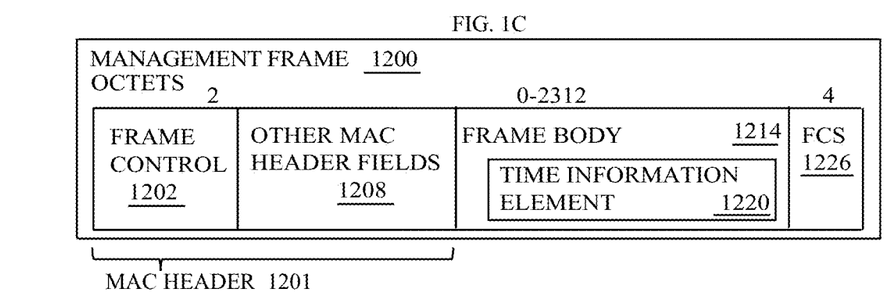
FIG. 1C depicts an embodiment of a management frame with a time information element for establishing communications between wireless communication devices.

FIG. 1C depicts an embodiment of a management frame 1200 for communications between wireless communication devices such as communications devices 1010, 1030, 1050, and 1055 in FIG. 1. The management frame 1200 may comprise a MAC header 1201, a frame body 1214, and a frame check sequence (FCS) field 1226. The MAC header 1201 may comprise the frame control field 1202 and other MAC header fields 1208. The frame control field 1202 may be two octets and may identify the type and subtype of the frame such as a management type and, e.g., a beacon frame subtype. The other MAC header fields 1208 may comprise, for example, one or more address fields, identification fields, control fields, or the like.

In some embodiments, the management frame 1200 may comprise a frame body 1214. The frame body 1214 may be a variable number of octets and may include data elements, control elements, or parameters and capabilities. In the present embodiment, the frame body 1214 comprises a time information element 1220.

Figure 1D:
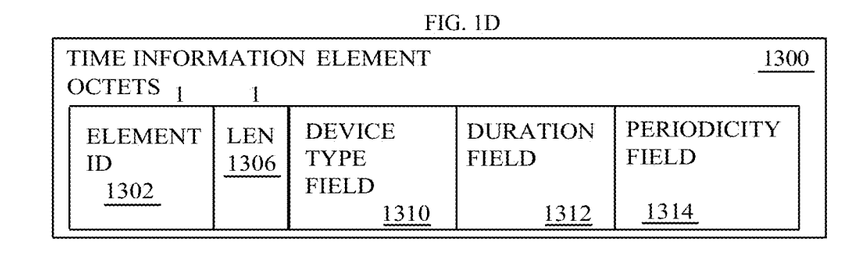
FIG. 1D depicts an embodiment of a time information element for establishing communications between wireless communication devices.

FIG. 1D illustrates an embodiment of a time information element 1300 such as the time information element 1220. The time information element 1300 may comprise fields such as an element identifier (ID) field 1302, a length field 1306, a device type field 1308, a duration field 1310, and a periodicity field 1314. The element ID field 1302 may be one octet and may identify the element as a time information element 1300. The length field 1306 may be one octet and may define the length of the time information element 1300 or the length of a portion thereof. The duration field 1312 may be, e.g., one octet and may indicate a duration of a time slot that is reserved for the devices identified in the device type field 1308. The periodicity field 1314 may be, e.g., one octet and may indicate a period between reservations of the time duration. In other words, the periodicity field 1314 may indicate a period that will pass between the occurrence of the first time duration and a second time duration. In further embodiments, the periodicity field 1314 or another field of the time information element 1300 may indicate the number of repetitions of the time duration.

Figure 1E:
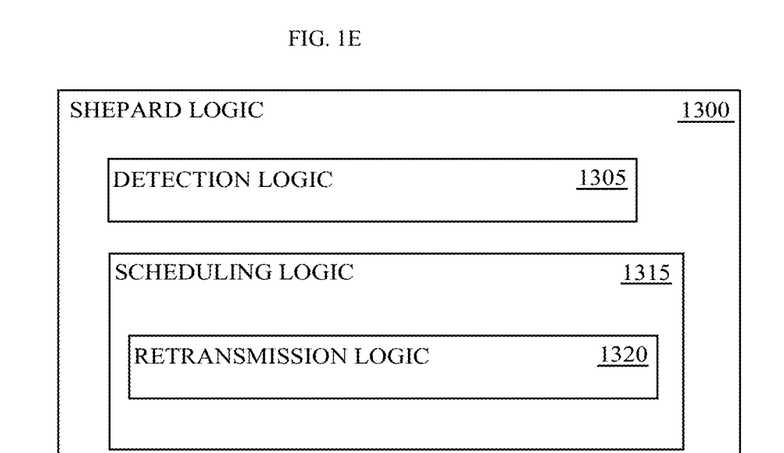
FIG. 1E depicts an embodiment of shepard logic for the system illustrated in FIG. 1.

FIG. 1E illustrates an embodiment of shepard logic 1300 such as the shepard logic 1056 illustrated in FIG. 1. The shepard logic 1300 may comprise detection logic 1305 to detect a communication by a LP-STA such as the communications device 1030 and may defer HP transmissions during a time duration in response to detecting the LP transmission. For example, once an LP-STA transmits using CSMA-CA, if there are no collisions, the detection logic 1305, which may reside within one or more HP-STAs of an HP BSS, may detect the LP transmission and set a time duration aside during which HP STAs should not transmit packets. The time duration may be determined in any manner known such as interpreting a network allocation vector (NAV) and may be set or predetermined to assure that the LP transmission has completed prior to initiating an HP transmission. In some embodiments, the shepard logic 1300 may comprise retransmission logic 1315 to retransmit or otherwise communicate the time duration such as a NAV to other HP STAs to reserve the time duration for the LP transmission.

In several embodiments, the scheduling logic 1315 of one or more HP-STAs, or the HP-AP, may transmit a management frame with a time information element such as the management frame and time information elements illustrated in FIGS. 1C-D. When the time information is received by an LP-STA, the LP-STA may choose to either ignore the time information, or to adopt and transmit packets during the time duration indicated in the management frame to avoid collisions with HP transmissions of the HP-STAs. If the LP-STA adopts the time information, the scheduling logic 1315 may defer HP transmissions for the full time duration to avoid a collision with the LP transmission. For instance, an LP-STA or an LP-AP may acknowledge the time slot allocation to confirm that the time information is being adopted. In some embodiments, the LP-AP may acknowledge, respond, or otherwise indicate that the LP-STAs adopt the time information in an HP transmission so that HP-STAs that might otherwise not detect the LP transmission can detect the adoption of the time information.

If the LP-STA does not adopt the time information, the scheduling logic 1315 may reduce the time duration. Transmission during the allocated time duration would only be LP transmissions, including transmissions by HP-STAs and the HP-AP, in order to ensure that the sensitivity footprint of the LP BSS components is matched. For example, HP-STA acknowledgements (ACKs) may be LP transmissions during the allocated time duration.

Referring again to FIG. 1, the MAC sublayer logic 1018, 1038 may comprise logic to implement functionality of the MAC sublayer of the data link layer of the communications device 1010, 1030. The MAC sublayer logic 1018, 1038 may generate the frames such as management frames, data frames, and control frames, and may communicate with the PHY logic 1019, 1039 to transmit the frames 1014, 1034. The PHY logic 1019, 1039 may generate physical layer protocol data units (PPDUs) based upon the frames 1014. More specifically, the frame builders 1013 and 1033 may generate the frames 1014, 1034 and data unit builders of the PHY logic 1019, 1039 may encapsulate the frames 1014, 1034 with preambles to generate PPDUs for transmission via a physical layer device such as the transceivers (RX/TX) 1020 and 1040.

The frame 1014, also referred to as a MAC layer Service Data Unit (MSDU), may comprise a management frame. For example, frame builder 1013 may generate a management frame such as the beacon frame to identify the communications device 1010 as having capabilities such as supported data rates, privacy settings, quality of service support (QoS), power saving features, cross-support, and a service set identification (SSID) of the network to identify the network to the communications device 1030.

The communications devices 1010, 1030, 1050, and 1055 may each comprise a transceiver such as transceivers 1020 and 1040. Each transceiver 1020, 1040 comprises a radio comprising an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols such as the short training field (STF) and long training field (LTF) symbols during transmission to avoid inter-symbol interference (ISI), which might result from multi-path distortion. These guard tones also help the signal conform to a spectral mask. The nulling of the direct component (DC) may be used to simplify direct conversion receiver designs.

In some embodiments, the communications device 1010 optionally comprises a Digital Beam Former (DBF) 1022, as indicated by the dashed lines. The DBF 1022 transforms information signals into signals to be applied via a radio to elements of an antenna array 1024. The antenna array 1024 is an array of individual, separately excitable antenna elements.

The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

Figure 2:
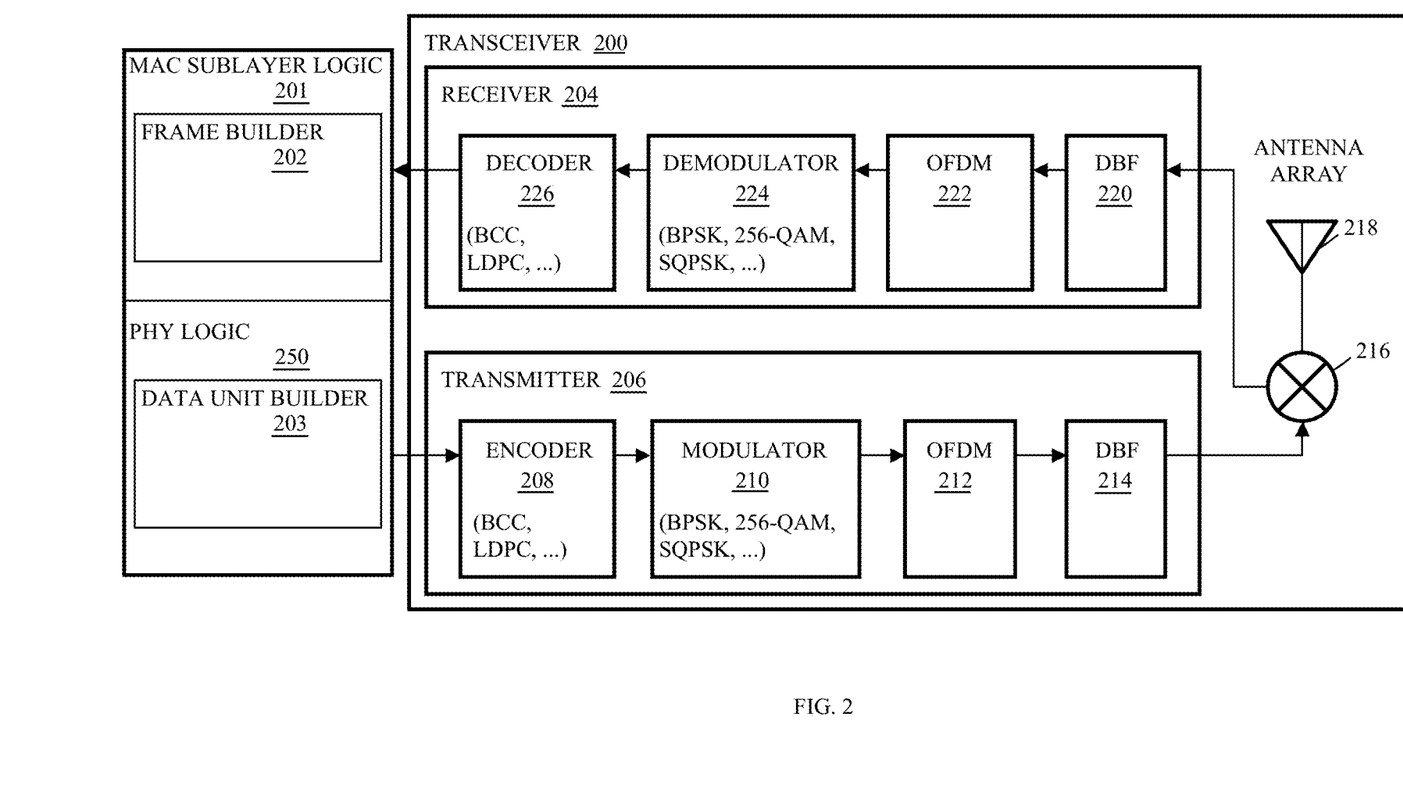
FIG. 2 depicts an embodiment of an apparatus to coordinate communications.

FIG. 2 depicts an embodiment of an apparatus to generate, communicate, transmit, receive, communicate, and interpret a frame. The apparatus comprises a transceiver 200 coupled with medium access control (MAC) sublayer logic 201. The MAC sublayer logic 201 may determine a frame such as a management frame and transmit the frame to the physical layer (PHY) logic 250. The PHY logic 250 may determine the PPDU by determining a preamble and encapsulating the frame with a preamble to transmit via transceiver 200.

In many embodiments, the MAC sublayer logic 201 may comprise a frame builder 202 to generate frames (MPDUs). The MAC sublayer logic 201 may then receive and parse and interpret a response frame. In many embodiments of LP-APs, the MAC sublayer logic 201 may comprise logic to generate a management frame such as a beacon frame and instruct the PHY logic 250 to transmit the management frame in an HP transmission. In several embodiments of HP-STAs, the MAC sublayer logic 201 may comprise logic to generate a management frame such as a beacon frame with a time information element and instruct the PHY logic 250 to transmit the management frame. In many of such embodiments, the MAC sublayer logic 201 may comprise logic to receive and process a response indicating whether the LP-STA adopts the time duration and to interpret the response to determine whether to maintain the time duration for LP transmissions or to reduce the time duration. For instances in which the LP-STA such as an LP-AP adopts the time duration, the MAC sublayer logic 201 may defer HP transmissions for the time duration. On the other hand, if the LP-STA does not respond or responds with an indication that the LP-STA does not adopt the time duration, the MAC sublayer logic 201 may reduce or eliminate the time duration.

The PHY logic 250 may comprise a data unit builder 203. The data unit builder 203 may determine a preamble and the PHY logic 250 may encapsulate the MPDU with the preamble to generate a PPDU. In many embodiments, the data unit builder 203 may create the preamble based upon communications parameters chosen through interaction with a destination communications device.

In many embodiments, the PHY logic 250 may change the transmission power between an LP transmission and an HP transmission. For instance, in response to an indication from the MAC sublayer logic 201 to increase the power of a transmission from an LP transmission to an HP transmission, the PHY logic 250 may change the transmission power. In some embodiments, the default transmission power may be LP and the PHY logic 250 may change the transmission power to HP for a single transmission, reverting back to LP transmissions absent additional instructions from the MAC sublayer logic 201.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal subcarriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise diplexers 216 connected to antenna array 218. Thus, in this embodiment, a single antenna array is used for both transmission and reception. When transmitting, the signal passes through diplexers 216 and drives the antenna with the up-converted information-bearing signal. During transmission, the diplexers 216 prevent the signals to be transmitted from entering receiver 204. When receiving, information bearing signals received by the antenna array pass through diplexers 216 to deliver the signal from the antenna array to receiver 204. The diplexers 216 then prevent the received signals from entering transmitter 206. Thus, diplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of subcarriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU, to the MAC sublayer logic 201.

After receiving a frame, the MAC sublayer logic 201 may access frame structures in memory to parse the frame. Based upon this information, the MAC sublayer logic 201 may determine a time duration for communicating for LP-STAs. In some embodiments, the MAC sublayer logic 201 may communicate with an LP-AP or another LP-STA during the time duration.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing. In some embodiments, for instance, the transceiver 200 may comprise one or more processors and memory including code to perform functions of the transmitter 206 and/or receiver 204.

Figure 3A:
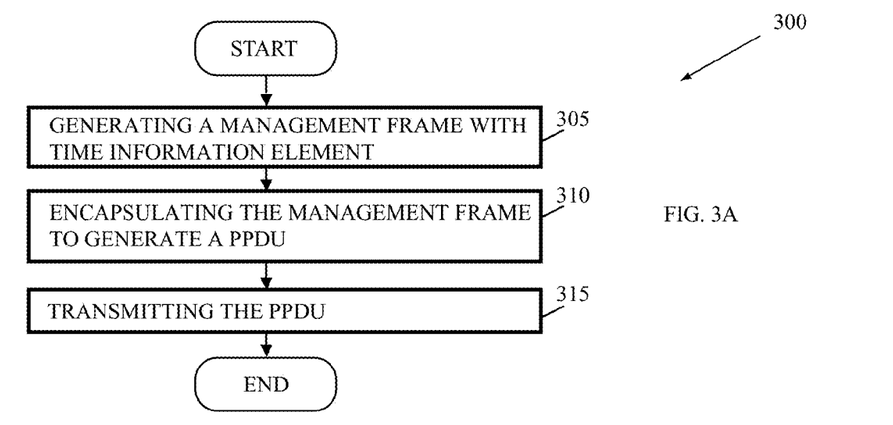
FIG. 3A-C depict embodiments of flowcharts to coordinate communications.
Figure 3B:
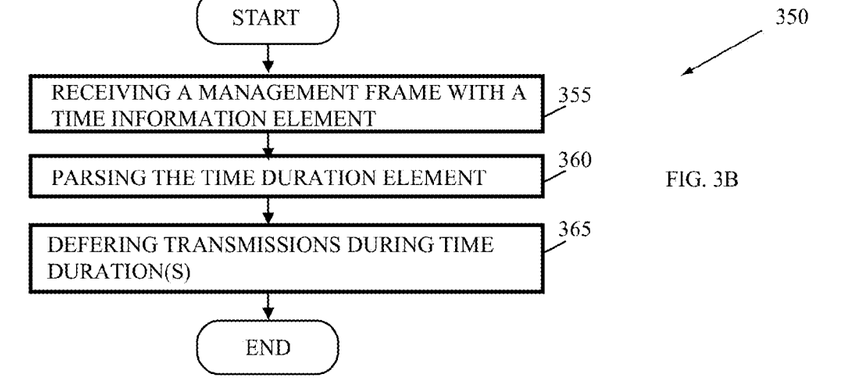
Figure 3C:
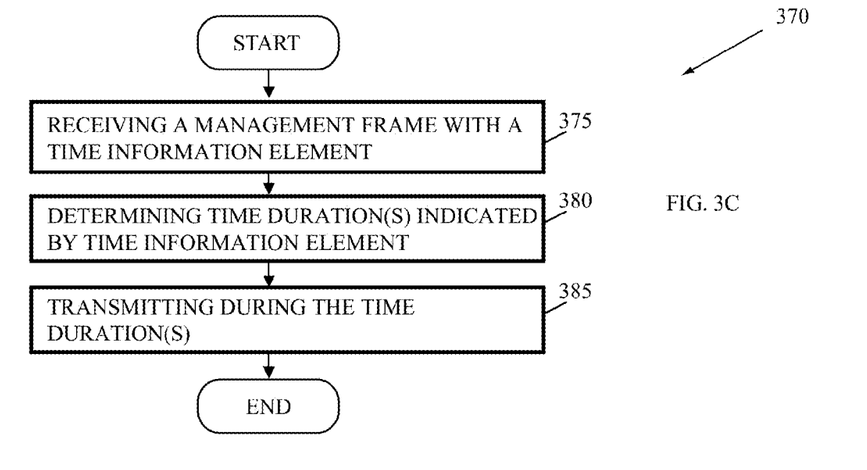

FIGS. 3A-C depict embodiments of flowcharts 300, 350, and 370 to coordinate communications. Referring to FIG. 3A, the flowchart 300 begins with generating a management frame with a time information element (element 305). In some embodiments, an LP-AP may generate a management frame such as a beacon frame to communicate a time duration. In some embodiments, the LP-AP may generate a management frame comprising a periodicity associated with the time duration. In further embodiments, the management frame may comprise an explicit or implicit association between the time duration and a reservation of a time slot for a LP device type or LP transmissions. And in several embodiments, the LP-AP may comprise MAC sublayer logic to instruct the PHY logic to transmit the management frame at a high transmit power to increase the number of HP-STAs that detect and interpret the management frame to defer HP transmissions during the time duration.

In further embodiments, an HP-AP or other HP-STA may generate a management frame such as a beacon frame to communicate a time duration and, in some embodiments, a periodicity to reserve a time slot for LP transmissions. In some embodiments, the time information element may comprise a device type field to indicate that the time duration is reserved for the particular device type. In several embodiments, the HP-AP or other HP-STA may comprise MAC sublayer logic to await a response to the management frame to determine whether the LP-STA adopts the time slot indicated by the time duration.

After generating the management frame, the PHY logic may encapsulate the management frame with a preamble to generate a PPDU (element 310). And the PHY may then transmit the PPDU via an antenna or an antenna array (element 315).

In FIG. 3B, the flowchart 300 begins with receiving a management frame with a time information element (element 355). In some embodiments, the MAC sublayer logic of an HP-STA may receive the management frame with the time information element and parse and interpret the management frame to determine that the HP-STA should defer HP transmissions or, in some embodiments, all transmissions for a time duration included in the time information element (element 360). In some embodiments, parsing and interpreting the time information element may involve parsing and interpreting a value for a periodicity that indicates that deferment to the LP transmissions for the time duration repeats periodically. In many embodiments, the HP-STA may, in response, defer transmissions or at least HP transmissions for the time duration or the periodically reoccurring time duration (element 365).

In FIG. 3C, the flowchart 300 begins with receiving a management frame with a time information element (element 375). In some embodiments, the MAC sublayer logic of an LP-STA may receive the management frame with the time information element and parse and interpret the management frame to determine that the LP-STA may adopt a time duration or a time duration that periodically repeats to avoid collisions with HP transmissions (element 380). In particular, the time duration may represent an allocated time slot during which one or more HP-STAs are deferring HP transmissions to facilitate LP transmissions.

If the LP-STA determines to adopt the time slot indicated by the time duration, the LP-STA may transmit an LP transmission during the time duration (element 385). In some embodiments, the LP-STA may be an LP-AP and the LP-AP may determine whether or not the time duration may be adopted by LP-STAs within the BSS of the LP-AP.

Figure 4:
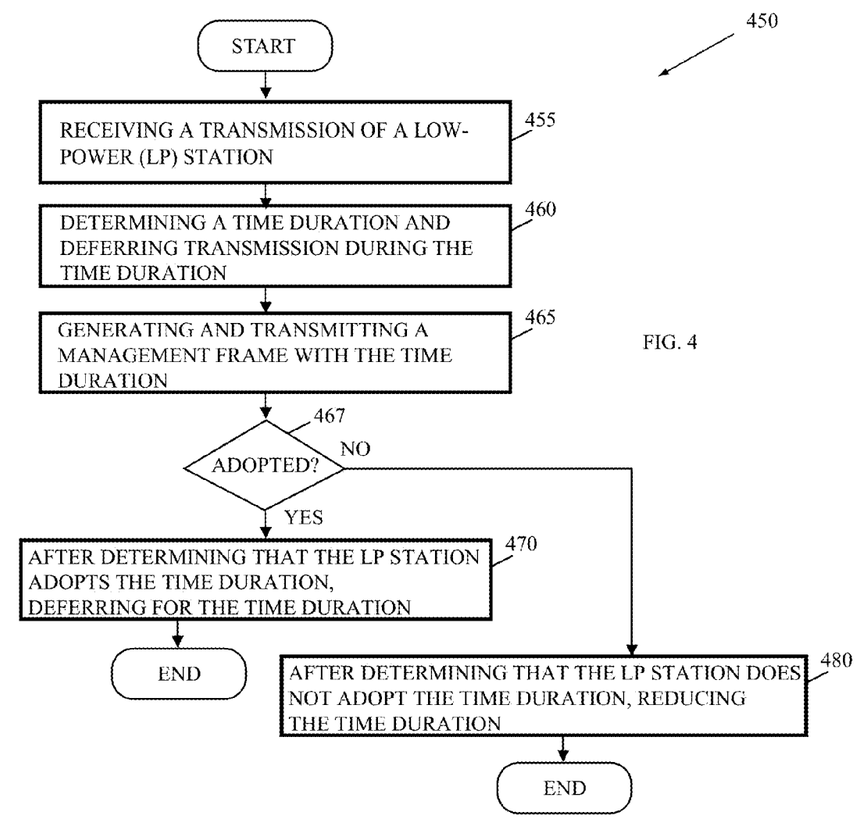
FIG. 4 depicts an embodiment of a flowchart to coordinate communications as illustrated in FIG. 2.

FIG. 4 depicts an embodiment of flowchart 450 to receive and interpret communications to coordinate transmissions of different types of devices on a wireless network such as the system described in conjunction with and illustrated in FIGS. 1 and 1A-E. The flowchart 450 begins with receiving a transmission of an LP-STA (element 455). Receiving a transmission of an LP-STA may comprise detecting an LP transmission by an HP-STA. The HP-STA may determine a time duration in response to the LP transmission, the time duration to match or exceed the duration of the LP transmission, and defer transmission for a time duration (element 460). In some embodiments, the time duration may be estimated, fixed and/or predetermined. In some embodiments, the time duration may be calculated or estimated based upon content of the LP transmission. In some embodiments, the time duration may be determined by other means.

In the present embodiment, after deferring for the duration, shepard logic of the HP-STA may determine a time duration for which the LP STAs may transmit and the HP-STA may generate and transmit a management frame indicating a time duration associated with low transmit power communication to instruct high-power communication devices to defer high transmit power transmissions for the time duration (element 465). In some embodiments, generating and transmitting a management frame may comprise transmitting, by the HP-STA, the time duration in a time information element of a management frame with a device type field value indicating that the time duration comprises a time slot allocated to LP transmissions. In further embodiments, generating and transmitting the management frame may comprise transmitting, by the HP-STA, a periodicity value in the time information element to associate the time duration with the periodicity to establish a periodic time slot allocation for low transmit power transmissions.

After transmitting the management frame, the HP-STA may determine whether or not an LP-STA adopted the time duration (element 467). After determining that the LP station adopts the time duration, the HP-STA may defer HP transmissions for the time duration (element 470). In some embodiments, determining that the LP station adopts the time duration may involve receiving an indication that an LP-STA adopts the time information and deferring high transmit power transmissions until the expiration of the time duration.

On the other hand, after determining that the LP station does not adopt the time duration, the HP-STA may reduce the time duration during which to defer HP transmissions (element 480) by, e.g., updating the time duration with a reduced time duration, transmitting the reduced time duration to other HP-STAs to update their time duration, and/or the like.

The following examples pertain to further embodiments. One example comprises a method. The method may involve generating, by a first communications device, a frame indicating a time duration associated with low transmit power communication to instruct high-power communication devices to defer high transmit power transmissions for the time duration; and transmitting, by the first communications device, the frame.

In some embodiments, the method may further comprise transmitting, by the antenna, the frame encapsulated by the preamble. In some embodiments, the method may further comprise detecting, by shepard logic of a high-power communications device, the low power communication and, in response, deferring high transmit power transmissions during the time duration, wherein the first communication device comprises a high-power communications device. In many embodiments, the method may further comprise transmitting, by the high-power communications device, the time duration in a time information element of a management frame with a device type field value indicating that the time duration comprises a time slot allocated to low transmit power transmissions. In several embodiments, the method may further comprise transmitting, by the high-power communications device, a periodicity value in the time information element to associate the time duration with the periodicity to establish a periodic time slot allocated to low transmit power transmissions. In some embodiments, the method may further comprise receiving an indication that a low-power communications device adopts the time information and deferring high transmit power transmissions until the expiration of the time duration. In some embodiments, the method may further comprise receiving an indication that a low-power communications device does not adopt the time duration and, in response, reducing deferment of the high-power transmissions to less than the time duration. In some embodiments, the method may further comprise transmitting, by the high-power communications device, low transmit power transmissions during the time duration. In several embodiments, transmitting, by the first communications device, comprises transmitting by an access point with a high transmit power, wherein the frame comprises a management frame with a time information element, the time information element comprising a device type field comprising an indication of a low-power device and a time duration field comprising the time duration. And in some embodiments, the method may further comprise transmitting, by the access point, a periodicity associated with the time duration in the frame.

At least one computer program product for communication of a packet with a frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a medium access control sublayer logic to generate a frame indicating a time duration associated with low transmit power communication to instruct high-power communication devices to defer high transmit power transmissions for the time duration; and a physical layer logic to encapsulate and transmit the frame.

In some embodiments, the apparatus may further comprise an antenna to transmit the frame encapsulated by the preamble. In some embodiments, the medium access control sublayer logic comprises shepard logic to detect the low power communication and, in response, defer high transmit power transmissions during the time duration, wherein the first communication device comprises a high-power communications device. In some embodiments, the medium access control sublayer logic comprises shepard logic to transmit the time duration in a time information element of a management frame with a device type field value indicating that the time duration comprises a time slot allocated to low transmit power transmissions. In some embodiments, the medium access control sublayer logic comprises logic to transmit a periodicity value in the time information element to associate the time duration with the periodicity to establish a periodic time slot allocated to low transmit power transmissions. In some embodiments, the medium access control sublayer logic comprises shepard logic to receive an indication that a low-power communications device adopts the time information and defer high transmit power transmissions until the expiration of the time duration. In some embodiments, the medium access control sublayer logic comprises shepard logic to receive an indication that a low-power communications device does not adopt the time information and to reduce deferment of the high transmit power transmissions to less than the time duration in response. In some embodiments, the medium access control sublayer logic comprises shepard logic to transmit, by a high-power communications device, low transmit power transmissions during the time duration. In some embodiments, the medium access control sublayer logic comprises logic to transmit, by an access point, a periodicity associated with the time duration in the frame. And in some embodiments of the apparatus, the medium access control sublayer logic comprises logic to transmit, by an access point, the frame with a high transmit power, wherein the frame comprises a management frame with a time information element, the time information element comprising a device type field comprising an indication of a low-power device and a time duration field comprising the time duration.

Another example comprises a system. The system may comprise a medium access control sublayer logic to generate a frame indicating a time duration associated with low transmit power communication to instruct high-power communication devices to defer high transmit power transmissions for the time duration; and a physical layer logic to encapsulate transmit the frame; and an antenna coupled with the physical layer logic to transmit the frame.

Another example comprises a program product. The program product to coordinate transmissions of different types of devices on a wireless network may comprise a storage medium comprising instructions to be executed by a processor-based device, wherein the instructions, when executed by the processor-based device, perform operations, the operations comprising: generating, by a first communications device, a frame indicating a time duration associated with low transmit power communication to instruct high-power communication devices to defer high transmit power transmissions for the time duration; and transmitting, by the first communications device, the frame.

In some embodiments, the operations may further comprise transmitting, by the antenna, the frame encapsulated by the preamble. In some embodiments, the operations may further comprise detecting, by shepard logic of a high-power communications device, the low power communication and, in response, deferring high transmit power transmissions during the time duration, wherein the first communication device comprises a high-power communications device. In many embodiments, the operations may further comprise transmitting, by the high-power communications device, the time duration in a time information element of a management frame with a device type field value indicating that the time duration comprises a time slot allocated to low transmit power transmissions. In several embodiments, the operations may further comprise transmitting, by the high-power communications device, a periodicity value in the time information element to associate the time duration with the periodicity to establish a periodic time slot allocated to low transmit power transmissions. In some embodiments, the operations may further comprise receiving an indication that a low-power communications device adopts the time information and deferring high transmit power transmissions until the expiration of the time duration. In some embodiments, the operations may further comprise receiving an indication that a low-power communications device does not adopt the time duration and, in response, reducing deferment of the high-power transmissions to less than the time duration. In some embodiments, the operations may further comprise transmitting, by the high-power communications device, low transmit power transmissions during the time duration. In several embodiments, transmitting, by the first communications device, comprises transmitting by an access point with a high transmit power, wherein the frame comprises a management frame with a time information element, the time information element comprising a device type field comprising an indication of a low-power device and a time duration field comprising the time duration. And in some embodiments, the operations may further comprise transmitting, by the access point, a periodicity associated with the time duration in the frame.

Another example comprises a method. The method may involve receiving, by a medium access control sublayer logic of a communications device, a frame comprising a time information element, the time information element comprising a time duration, the time duration indicating a time slot allocated for low transmit power transmissions during which high transmit power transmissions are to be deferred; and communicating, by the communications device, during the time duration.

In some embodiments, receiving the frame comprising the time information element comprises receiving the time information element comprising a device type associated with the time duration, the device type indicating that the time slot is allocated for low-power communications devices. In some embodiments, receiving the frame comprising the time information element comprises receiving the time information element comprising a periodicity associated with the time duration, the periodicity indicating a periodicity of the time slot allocated for low transmit power transmissions during which high transmit power transmissions are to be deferred. And in many embodiments, communicating, by the communications device, during the time duration comprises storing an indication of the time duration and the periodicity in memory and communicating during more than one of the time slots.

At least one computer program product for communication of a packet with a frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a medium access control sublayer logic to receive a frame comprising a time information element, the time information element comprising a time duration, the time duration indicating a time slot allocated for low-power communications and during which high-power communications are to be deferred; and a physical layer logic to communicate during the time slot.

In some embodiments, the apparatus may further comprise an antenna coupled with the physical layer logic to transmit a communication during the time slot. In some embodiments, the apparatus may further comprise memory coupled with the medium access control sublayer logic, the medium access control sublayer logic to store an indication of the time slot in the memory. And in some embodiments, the medium access control sublayer logic comprises logic to receive the time information element comprising a periodicity associated with the time duration, the periodicity indicating a periodicity of the time slot allocated for low-power communications and during which high-power communications are to be deferred.

Another example comprises a system. The system may comprise a medium access control sublayer logic to receive a frame comprising a time information element, the time information element comprising a time duration, the time duration indicating a time slot allocated for low-power communications and during which high-power communications are to be deferred; and a physical layer logic to communicate during the time slot; and an antenna coupled with the physical layer logic to receive the frame.

Another example comprises a program product. The program product to coordinate transmissions of different types of devices on a wireless network may comprise a storage medium comprising instructions to be executed by a processor-based device, wherein the instructions, when executed by the processor-based device, perform operations, the operations comprising: receiving, by a medium access control sublayer logic of a communications device, a frame comprising a time information element, the time information element comprising a time duration, the time duration indicating a time slot allocated for low transmit power transmissions during which high transmit power transmissions are to be deferred; and communicating, by the communications device, during the time duration.

In some embodiments of the program product, receiving the frame comprising the time information element comprises receiving the time information element comprising a device type associated with the time duration, the device type indicating that the time slot is allocated for low-power communications devices. In some embodiments, receiving the frame comprising the time information element comprises receiving the time information element comprising a periodicity associated with the time duration, the periodicity indicating a periodicity of the time slot allocated for low transmit power transmissions during which high transmit power transmissions are to be deferred. And in some embodiments, communicating, by the communications device, during the time duration comprises storing an indication of the time duration and the periodicity in memory and communicating during more than one of the time slots.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch, e-fuse, or the like. Still further features may be selected by a user after via a selectable preference such as a software preference, an e-fuse, or the like.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, a dipswitch, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks.

Modem, Bluetooth™, Ethernet, Wi-Fi, and WiDi adapter cards are just a few of the currently available types of network adapters.

What is claimed is:

1. A method to coordinate wireless transmissions of high-power communications devices and low-power communications devices, the method comprising:
   determining, by a first communications device, a time duration to allocate for low transmit power transmissions; and
   instructing, by the first communications device, high-power communication devices to defer high transmit power transmissions for the time duration to avoid a collision between a high transmit power transmission and a low transmit power transmission by allocating the time duration for low transmit power transmissions, wherein allocating comprises:
      generating a frame indicating the time duration; and
      transmitting the frame indicating the time duration.

2. The method of claim 1, further comprising detecting, by shepard logic of a high-power communications device, a low transmit power transmission and, in response, deferring high transmit power transmissions during the time duration, wherein the first communication device comprises the high-power communications device.

3. The method of claim 2, further comprising transmitting, by the high-power communications device, the time duration in a time information element of a management frame with a device type field value indicating that the time duration comprises a time slot allocated for low transmit power transmissions.

4. The method of claim 3, further comprising transmitting, by the high-power communications device, a periodicity value in the time information element to associate the time duration with the periodicity to establish a periodic time slot allocated to low transmit power transmissions.

5. The method of claim 3, further comprising receiving an indication that a low-power communications device adopts the time information and deferring high transmit power transmissions until an expiration of the time duration.

6. The method of claim 3, further comprising receiving an indication that a low-power communications device does not adopt the time duration and, in response, reducing deferment of the high-power transmissions to less than the time duration.

7. The method of claim 1, further comprising transmitting, by a high-power communications device, low transmit power transmissions during the time duration, wherein the high-power communications device is the first communications device.

8. The method of claim 1, wherein transmitting, by the first communications device, comprises transmitting by an access point with a high transmit power, wherein the frame comprises a management frame with a time information element, the time information element comprising a device type field comprising an indication of a low-power device and a time duration field comprising the time duration.

9. The method of claim 8, further comprising transmitting, by the access point, a periodicity associated with the time duration in the frame.

10. An apparatus to coordinate transmissions of different types of devices on a wireless network, the apparatus comprising:
    a medium access control logic comprising hardware to determine a time duration to allocate for low transmit power transmissions and to instruct high-power communication devices to defer high transmit power transmissions for the time duration to avoid a collision between a high transmit power transmission and a low transmit power transmission by allocation of the time duration for low transmit power transmissions, wherein allocation comprises generation of a frame indicating the time duration, the frame; and
    a physical layer logic to transmit a preamble with the frame indicating the time duration to instruct high-power communication devices to defer high transmit power transmissions for the time duration.

11. The apparatus of claim 10, further comprising one or more antennas coupled with a radio and a processor to transmit the frame.

12. The apparatus of claim 10, wherein the medium access control logic comprises shepard logic to detect a low power communication and, in response, defer high transmit power transmissions during the time duration, wherein the apparatus comprises a high-power communications device.

13. The apparatus of claim 10, wherein the medium access control logic comprises shepard logic to transmit the time duration in a time information element of a management frame with a device type field value indicating that the time duration comprises a time slot allocated to low transmit power transmissions.

14. The apparatus of claim 13, wherein the medium access control logic comprises logic to transmit a periodicity value in the time information element to associate the time duration with the periodicity to establish a periodic time slot allocated to low transmit power transmissions.

15. The apparatus of claim 10, wherein the medium access control logic comprises shepard logic to receive an indication that a low-power communications device adopts the time information and defer high transmit power transmissions until an expiration of the time duration.

16. The apparatus of claim 10, wherein the medium access control logic comprises shepard logic to receive an indication that a low-power communications device does not adopt the time information and to reduce deferment of the high transmit power transmissions to less than the time duration in response.

17. The apparatus of claim 10, wherein the medium access control logic comprises logic to transmit, by an access point, the frame with a high transmit power, wherein the frame comprises a management frame with a time information element, the time information element comprising a device type field comprising an indication of a low-power device and a time duration field comprising the time duration.

18. A method to coordinate wireless transmissions of high-power communications devices and low-power communications devices, the method comprising:
    receiving, by a first communications device, a frame indicating a time duration associated with low transmit power communication;
    adopting the time duration if the first communications device is a low-power communications device, wherein adopting comprises transmitting a low transmit power transmission during the time duration in response to receipt of the frame to avoid a collision with a high transmit power transmission; and
    deferring high transmit power transmissions during the time duration if the first communications device is a high-power communications device that is capable of high transmit power transmissions to avoid a collision with a low transmit power transmission in response to receipt of the frame.

19. The method of claim 1, further comprising detecting, by shepard logic, a prior low transmit power transmission and, in response, deferring high transmit power transmissions during the time duration, wherein the first communication device comprises a high-power communications device.

20. The method of claim 1, further comprising transmitting, by the high-power communications device, the time duration in a time information element of a management frame with a device type field value indicating that the time duration comprises a time slot allocated to low transmit power transmissions.

21. A program product to coordinate wireless transmissions of high-power communications devices and low-power communications devices, the program product comprising:
   a non-transitory storage medium comprising instructions to be executed by a processor-based device, wherein the instructions, when executed by the processor-based device, perform operations, the operations comprising:
      receiving, by a medium access control logic of a communications device, a frame comprising a time information element, the time information element comprising a time duration, the time duration indicating a time slot allocated for low transmit power transmissions during which high transmit power transmissions are to be deferred;
      adopting the time duration if the communications device is a low-power communications device, wherein adopting comprises transmitting a low transmit power transmission during the time duration in response to receipt of the frame to avoid a collision with a high transmit power transmission; and
      deferring high transmit power transmissions during the time duration if the communications device is a high-power communications device that is capable of high transmit power transmissions to avoid a collision with a low transmit power transmission in response to receipt of the frame.

22. The program product of claim 21, wherein receiving the frame comprising the time information element comprises receiving the time information element comprising a device type associated with the time duration, the device type indicating that the time slot is allocated for low-power communications devices.

23. The program product of claim 21, wherein receiving the frame comprising the time information element comprises receiving the time information element comprising a periodicity associated with the time duration, the periodicity indicating a periodicity of the time slot allocated for low transmit power transmissions during which high transmit power transmissions are to be deferred.

24. The program product of claim 21, wherein communicating, by the communications device, during the time duration comprises storing an indication of the time duration and the periodicity in memory and communicating during more than one of the time slots.

25. An apparatus to coordinate wireless transmissions of high-power communications devices and low-power communications devices, the apparatus comprising:
   a medium access control logic comprising hardware to receive a frame comprising a time information element, the time information element comprising a time duration, the time duration indicating a time slot allocated for low transmit power transmissions during which high transmit power transmissions are to be deferred;
   adopt the time duration if the communications device is a low-power communications device, wherein adoption comprises transmission of a low transmit power transmission during the time duration in response to receipt of the frame to avoid a collision with a high transmit power transmission; and
   defer high transmit power transmissions during the time duration if the communications device is a high-power communications device that is capable of high transmit power transmissions to avoid a collision with a low transmit power transmission in response to receipt of the frame.

26. The apparatus of claim 25, further comprising one or more antennas coupled with a physical layer logic, a radio, and a processor to transmit a low transmit power communication during the time slot.

27. The apparatus of claim 25, further comprising memory coupled with the medium access control logic, the medium access control sublayer logic to store an indication of the time slot in the memory.

28. The apparatus of claim 25, wherein the medium access control logic comprises logic to receive the time information element comprising a periodicity associated with the time duration, the periodicity indicating a periodicity of the time slot allocated for low-power communications and during which high-power communications are to be deferred.

29. A program product to coordinate transmissions of different types of devices on a wireless network, the program product comprising:
   a non-transitory storage medium comprising instructions to be executed by a processor-based device, wherein the instructions, when executed by the processor-based device, perform operations, the operations comprising:
      determining a time duration to allocate for low transmit power transmissions; and
      instructing high-power communication devices to defer high transmit power transmissions for the time duration to avoid a collision between a high transmit power transmission and a low transmit power transmission by allocating the time duration for low transmit power transmissions, wherein allocating comprises:
         generating a frame indicating the time duration; and
         transmitting the frame indicating the time duration.

30. The program product of claim 29, wherein transmitting the frame comprises transmitting by an access point with a high transmit power, wherein the frame comprises a management frame with a time information element, the time information element comprising a device type field comprising an indication of a low-power communication device and a time duration field comprising the time duration.

* * * * *